United States Patent [19]
Christie

[11] 3,958,593
[45] *May 25, 1976

[54] APPARATUS FOR CONNECTING A MAIN TO A PLURALITY OF SIZES OF SERVICE LINES

[76] Inventor: Joe William Christie, Box 386, Frisco, Tex. 75034

[ * ] Notice: The portion of the term of this patent subsequent to Feb. 10, 1993, has been disclaimed.

[22] Filed: Sept. 26, 1974

[21] Appl. No.: 509,719

Related U.S. Application Data
[63] Continuation-in-part of Ser. No. 469,529, May 13, 1974.

[52] U.S. Cl. .................................. 137/318; 285/3; 285/197
[51] Int. Cl.² ..................... B23B 41/08; F16E 41/04
[58] Field of Search ............ 137/318, 317; 285/197, 285/198, 199, 3

[56] References Cited
UNITED STATES PATENTS

| | | | |
|---|---|---|---|
| 1,701,786 | 2/1929 | McMurry | 137/318 |
| 2,608,989 | 9/1952 | McDonald | 137/318 |
| 3,302,493 | 2/1967 | Hulslander | 137/318 X |
| 3,349,805 | 10/1967 | Fried | 285/3 X |
| 3,692,044 | 9/1972 | Wise | 137/318 |

Primary Examiner—Alan Cohan
Attorney, Agent, or Firm—Richards, Harris & Medlock

[57] ABSTRACT

Disclosed is an apparatus for selectively connecting different sizes of service conduits to mains. The apparatus has a fitting with first and second bores therethrough. These bores are axially spaced and positioned in the fitting to radially extend from the main when the fitting is fixed thereto. A port adjacent the end of the fitting shaped for connection to the exterior of the main interconnects the two through bores. An annular flange is provided around a counterbore in the first bore for selectively connecting various sizes of service lines to the fitting. Internal threads are formed in the second bore for receiving an externally-threaded tapping means for manipulation axially through the bore to cut a coupon from the wall of the main to interconnect the main with the first bore. A sealing plug is provided for sealing the open end of the second bore.

7 Claims, 7 Drawing Figures

APPARATUS FOR CONNECTING A MAIN TO A PLURALITY OF SIZES OF SERVICE LINES

The present application is a continuation-in-part of copending Ser. No. 469,529, filed May 13, 1974.

BACKGROUND OF THE INVENTION

The present invention relates to improvements in apparatus for connecting service lines to mains. More particularly, the present invention relates to improvements in fittings for use in selectively connecting a plurality of sizes of service lines to a main.

In the provision of utility services to residential areas, and the like, it has been common to use conduits for gas mains formed from polyethylene, and the like. These gas mains are normally installed parallel to and under the center of a road or alley. The individual service connections to the main by residences, and the like, extend horizontally from and a right angle to the main.

In providing these service connections to a main in environments such as residential developments, it is desirable and quite common to use a fitting to form a right angle connection to the main. Many of these fittings can be installed while gas is present in the main and without disturbing service of customers already connected to the main. These fittings typically have means for attaching to the exterior of the main and means for forming a port in the wall of the main. In addition, means are provided on these fittings for connection to a service line.

It has been found that due to such factors as building specifications, user volume requirements and supplies of conduit, various sizes of service conduits are used. The typical service conduits range from one inch outer diameter conduit down to sizes smaller than one-half inch outer diameter. Since, conventional fittings are designed for connection to only one size of conduit, a plurality of different fittings must be inventoried to accommodate these various sizes of service conduits.

Therefore, according to the present invention, an improved apparatus for selectively connecting a plurality of sizes of service lines to a gas main is provided.

More specifically, according to the present invention, an apparatus for connection to a gas main is provided comprising a fitting with one end shaped to be fixed to the exterior wall of a gas main. The fitting has first and second through bores extending transverse to the length of the gas main. The bores are positioned to be axially spaced along the length of the gas main and radially extending therefrom when the fitting is fixed to the main. The first through bore is provided with means for selective connection to a plurality of sizes of service lines. The second through bore is connected to the first by a port. The second through bore is provided with internal threads for engaging an externally-threaded tapping means. The tapping means has a cutting head at one end and is axially manipulated in the bore to remove a coupon from the wall of the main to connect the gas main to the service line. The tapping means can be backed off and a plug placed in the end of the second bore to seal the same.

The advantages and features of the present invention will be readily appreciated by those of ordinary skill in the art as the same becomes better appreciated by the following description when considered in connection with the accompanying Drawings, in which.

DESCRIPTION OF THE PREFERRED EMBODIMENT

Figure 1:
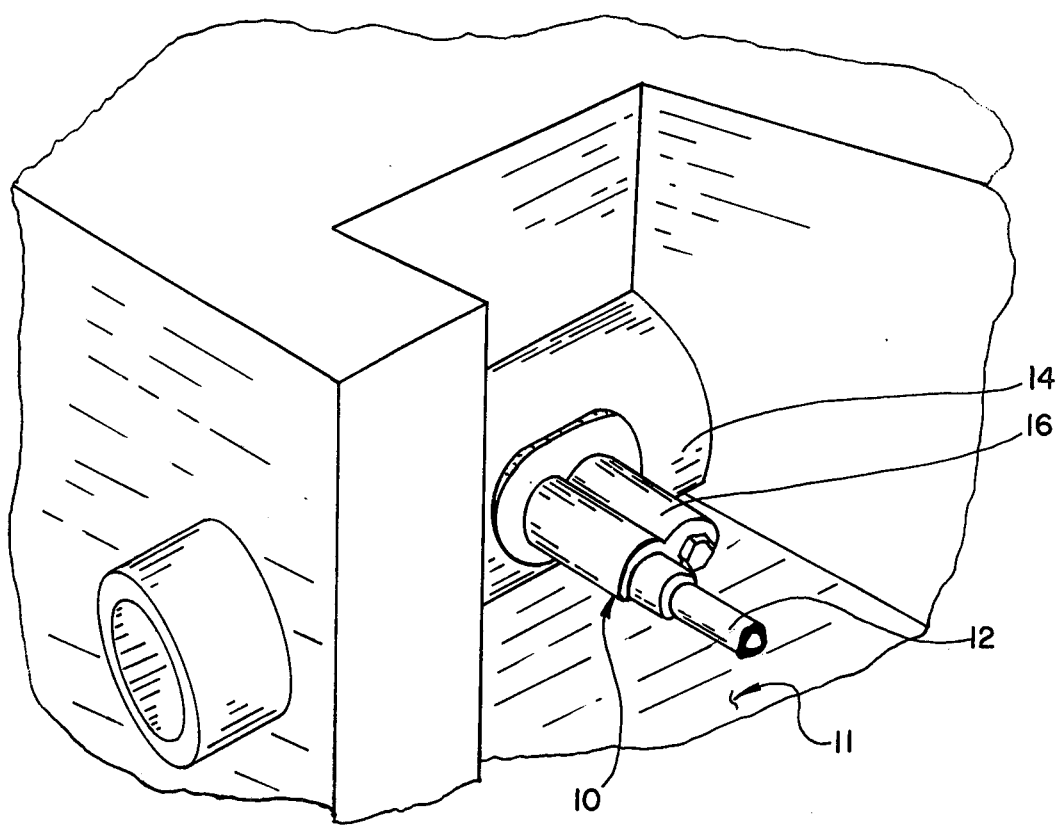
FIG. 1 is a perspective view of the improved apparatus of the present invention shown attaching a service line at right angle to a gas main buried in the ground.

Turning now to the Drawings wherein like reference characters designate like or corresponding parts throughout the several views, there is illustrated in FIGS. 1 through 6, one embodiment of the improved apparatus 10 for connecting a service conduit at a right angle to a gas main. This apparatus 10 is illustrated in a trench 11 attaching a ¾ inch diameter service conduit at right angles to a gas main conduit 14. The service conduit 12 normally is connected to a residence or the like, while the conduit 14 is connected to a source of gas.

In the particular embodiment of the invention illustrated, a right angle connection to the service line is shown. This right angle connection to the main can be buried in the soil as illustrated in FIG. 1. In addition, due to the improved features of the invention, the fitting 16 can be used to connect to a different size service line, if required.

Figure 2:
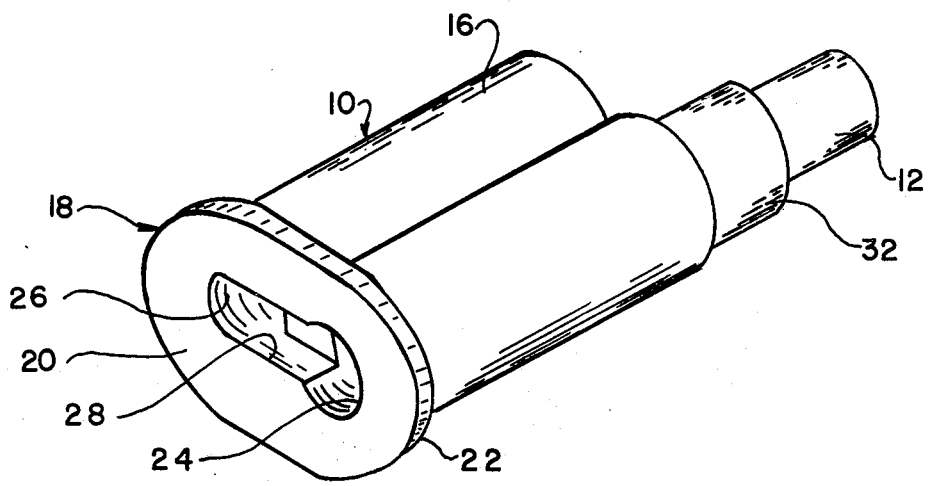
FIG. 2 is a perspective view of the apparatus of FIG. 1, showing the end which is fixed on the main.
Figure 4:
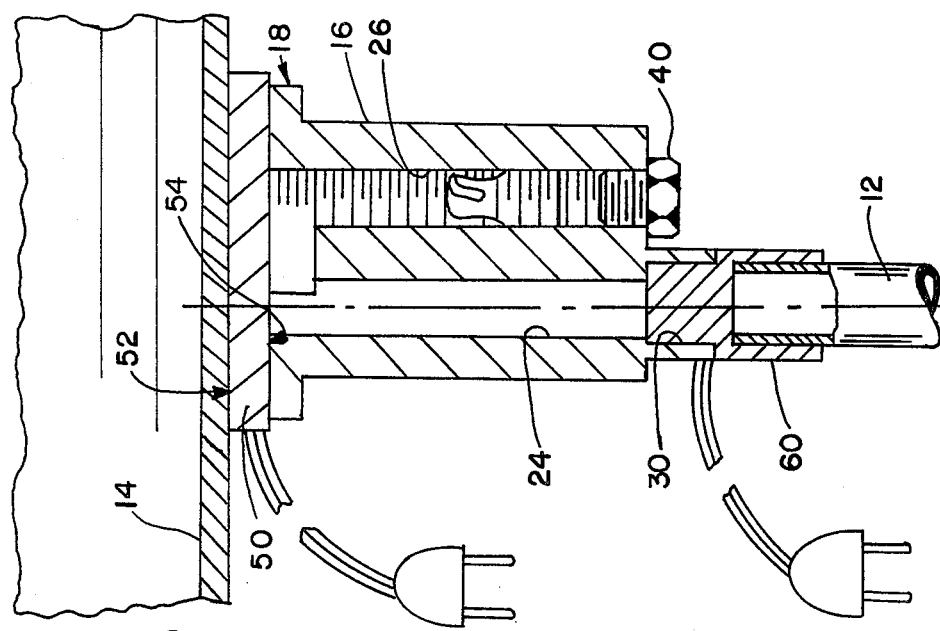
FIG. 4 is a view similar to FIG. 3 with the improved apparatus of the present invention shown being heated prior to connection to a gas main and a service line.

By referring to FIGS. 2, 3, and 4, the improved apparatus 10 of the present invention will be described in detail. The apparatus 10 has a rigid fitting 16. This fitting 16 is elongated in shape and has a generally figure-eight shaped cross section. The fitting can be formed from any material suitable for fixing to the exterior wall of the main 14. Typical materials are plastics, such as polyethylene, to allow fusing to a main 14 and service line 12 of like material. It is to be understood that other materials could be used.

The fitting 16 has an end 18 which is constructed to conform with and attach to the exterior of the gas main 14. This end 18 has a concave cylindrical surface 20, which extends onto an arcuate flange 22 on the fitting 16. Concave surface 20 conforms with the wall of the gas main 14. This conforming surface 20 facilitates fusion and sealing of the fitting 16 to the exterior of the gas main 14, as will be hereinafter described in detail.

It is to be understood, of course, that even though the flange 22 adds substantially to the strength of the fitting 16 that the end 18 could be formed without the flange.

Figure 3:
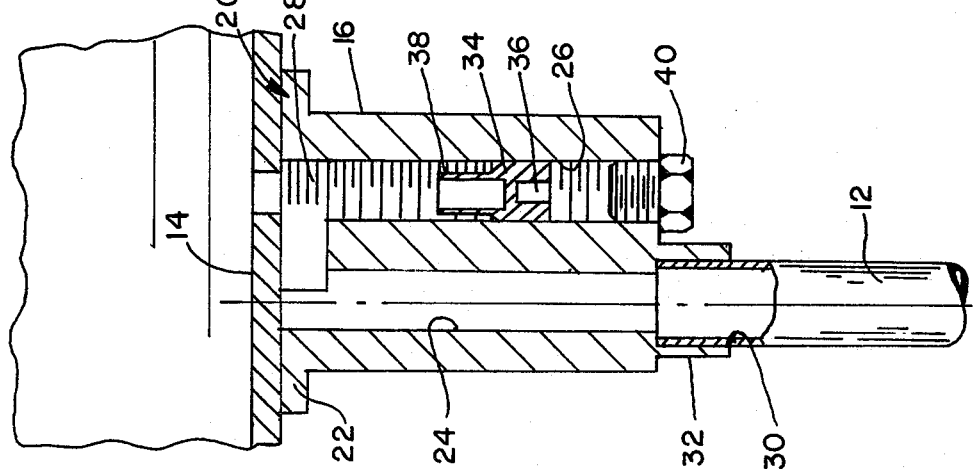
FIG. 3 is a section view of the improved apparatus of the present invention attaching a large service line to a main, taken on line 3—3 of FIG. 3, looking in the direction of the arrows.

As illustrated in FIGS. 1 and 3, the fitting 16 is adapted to be mounted in a horizontally-extending position on the exterior of the gas main 14. Typical methods of attaching includes plastic fusion, and the like.

The fitting 16 has a pair of spaced parallel through bores 24 and 26 extending the length of the fitting. These through bores are positioned to extend radially from the surface 20 and the center of main 14 when the fitting 16 is properly fixed thereon. These bores 24 and 26 are positioned with center lines intersecting the center line of the main 14. A port 28 interconnects bores 24 and 26 at a point adjacent the end 18. This connection provides flow communication between through bores 24 and 26.

According to a particular feature of the present invention, bore 24 is of a size and shape to be adapted to receive a ½ inch diameter service conduit 70 therein, (hereinafter explained with reference to FIG. 6). An annular flange 32 is provided on the end opposite end 18 around the opening of the bore 24. In addition, an enlarged counterbore 30 is formed in the annular flange 32. Counterbore 30 is of a size and shape to receive the ¾ inch service conduit 12.

The through bore 26 is internally threaded along its length for receiving an externally-threaded cutter 34. The external threads on the cutter 34 are selelcted to mate with the internal threads in the bore 26. Rotation of cutter 34 will cause the cutter 34 to axially translate along the bore 26.

The cutter 34 has a hexagonal socket 36 for engaging a tool. A cutting edge 38 is provided on the cutter on the opposite end from the socket 36. For purposes of the present invention, the particular shape and type of cutting edge 38 on the cutter 34 is not material. The cutter 34 can by any prior art device which is well known in the art for tapping a hole in the side of a gas main. It is desirable, although not essential, that the cutter 34 be of a type which, when tapping a hole, retains the removed coupon in the cutter to prevent it from entering the gas main 14 or service line 12.

A plug 40 can be provided for sealing the open end of the bore 26. The plug 40 can be of any of a plurality of conventional designs. In the present invention, the plug 40 is provided with a threaded portion which is of a size to engage the threads of bore 26. An O-ring seal is provided for sealing between the plug 40 and the walls of the through bore 26. An annular sealing groove can be provided at the exterior end of the through bore 26 to accommodate the O-ring seal. A hexagonal head can be provided on the plug 40 for screwing the plug into and out of the through bore 26.

INSTALLATION PROCEDURE

The present embodiment of the present invention can be understood through an explanation of the installation procedure for the improved apparatus 10 of the present invention to provide a right angle service connection to a gas main. The description of the installation will be made by referring particularly to FIGS. 3, 4, and 5.

The first step in installing the improved apparatus 10 of the present invention is the excavation of an access trench 11 to the main 14 as shown in FIG. 1. Next, the fitting 16 with the cutter 34 and plug 40 installed therein is prepared for installation. The end 18 is placed adjacent to a conventional heater assembly 50, as shown in FIG. 4. This heater 50 is provided with a concave surface 52 and a convex surface 54. The concave surface 52 conforms with the cylindrical exterior of the main 14 while the convex surface 54 conforms with the surface 20 on end 18 of the fitting 16. The heater is a conventional design, and is provided with a plurality of electrical heating coils which, when activated, will heat the surface of the end 18 and the exterior of the main 14. This process is continued until the plastic material forming the main and the fitting 16 is softened such that when the heater is removed and the fitting 16 is pressed against the exterior of the main 14, the two will be fused together. The fitting 16 is positioned so that the center line of bore 24 extends horizontally from the side of the main 14. This center line is positioned to intersect the center line of main 14 at a right angle.

In a conventional manner, a heater assembly 60 is provided with a male portion extending into counterbore 30 and a female portion of a size to receive the end of the service conduit 12 therein. The interior of the counterbore 30 and exterior of the conduit 12 are heated such that when the heater 60 is removed and the conduit 12 inserted within the counterbore 30, the conduit 12 will fuse with the material of the flange 32 to attach the two together and provide a positive seal therebetween. Thus, the service conduit 12 is attached to the fitting 16 which is in turn fixed and sealed on the exterior of the main 14.

Figure 5:
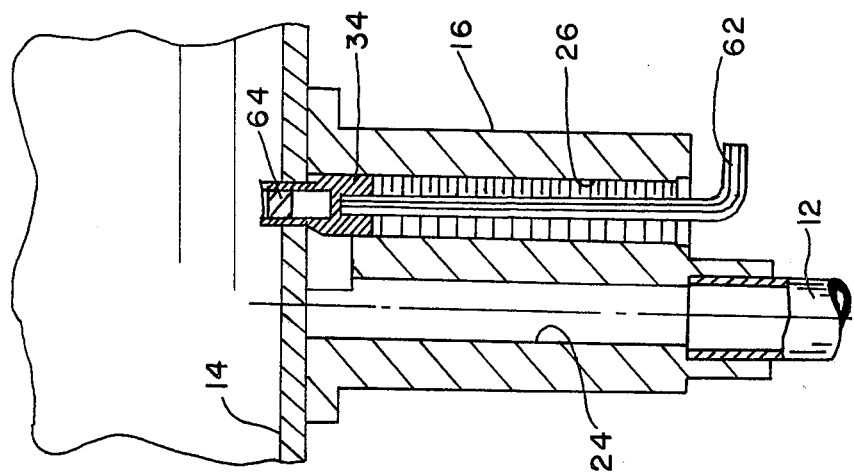
FIG. 5 is a view similar to FIG. 3 illustrating the tap axially reciprocated to a point of cutting through the wall of the gas main.

Once the fitting is welded to main 14 and conduit 12, plug 40 is removed. With the plug removed, as illustrated in FIG. 5, an Allen wrench 62, socket wrench, or the like, can be used to engage the socket of the cutter 34, as shown. The cutter 34 then can be rotated by the tool 62 to cause the cutter to axially translate in a direction toward the exterior wall of the gas main 14. The cutter 34 is manipulated until the cutting edge engages the wall of the gas main 14 and removes a circular coupon 64 from the wall thereof. This is best illustrated in FIG. 5, wherein the coupon 64 is shown cut from the wall of the gas main 14, and retained within the interior of the cutting edge of the cutter 34. Upon completion of the cutting of the coupon 64 from the wall of the gas main 14, the direction of rotation of the cutter 34 can be reversed to back the cutter off to the position illustrated in FIG. 3. The tool 62 can be removed and plug 40 installed to seal the open end of the through bore 26.

It is important to note that the removal of the coupon 64 from the wall of the gas main forms a port 66 in the wall of the gas main 14 which allows the gas to flow to the service conduit 12 by way of through bore 26, port 28, and through bore 24. Thus, a right angle connection is made to a ¾ inch service conduit 12 without interrupting the service and with a minimal size trench 11.

Figure 6:
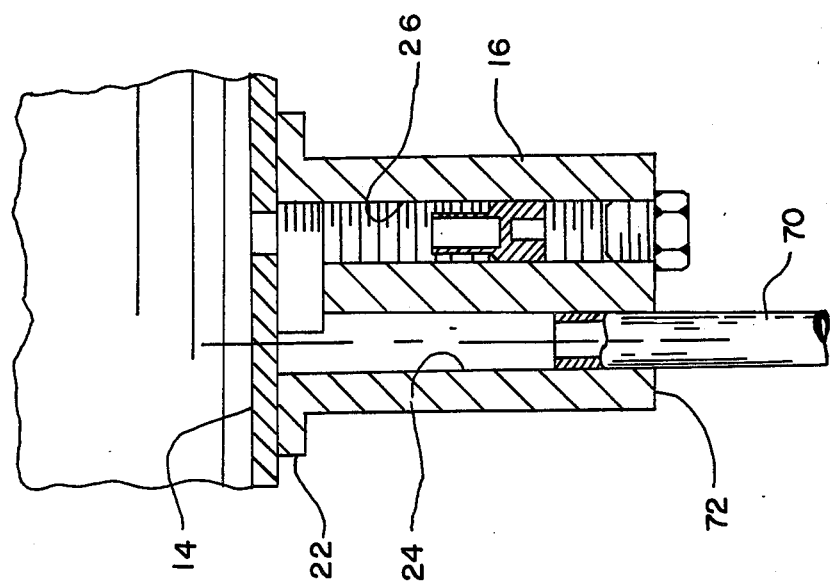
FIG. 6 is a view similar to FIG. 3 illustrating the improved apparatus of the present invention connecting a smaller service line to a main.

In FIG. 6, a ½ inch diameter service conduit 70 is illustrated connected to main 14 by fitting 16. The fitting 16 in FIG. 6 has been altered slightly by removing flange 32. This can be accomplished in the field at the site of installation by cutting along the surface 72. With the flange 32 removed, the fitting 16 can be attached to main 14 by heater 50, as illustrated in FIG. 4. Thereafter, a heater (not shown) similar to assembly 60 can be provided to fit in bore 24 around the ½ inch conduit 70. The conduit 70 can then be fused in bore 24.

Thus, a single fitting 16 is provided which can be used to attach either ¾ inch service conduit 12 or ½ inch service conduit 70 to main 14.

Figure 7:
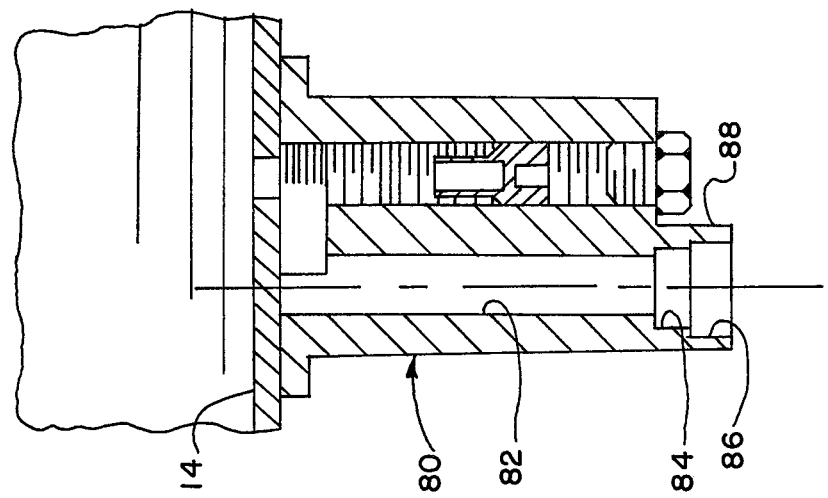
FIG. 7 is a sectional view of an alternative embodiment of the improved apparatus of the present invention.

In FIG. 7, an alternative embodiment of the fitting 80 is illustrated. This fitting, in addition to through bore 82, has two concentric counterbores 84 and 86 inside an annular flange 88. It is envisioned that, for example, bores 86, 84, and 82 would, respectively, accommodate service conduits with one inch, three-quarter inch, and one-half inch diameters. It is envisioned, of course, that other configurations of the counterbores than the ones shown could be used. It is also envisioned that the present invention could be embodied in other types of fittings.

It should be understood, of course, that the foregoing disclosure relates only to the preferred embodiments of the invention, and that numerous modifications or alterations may be made therein by those of ordinary skill in the art without departing from the spirit and scope of the invention as defined in the appended claims.

I claim:

1. An apparatus for selectively connecting a plurality of sizes of service lines at a right angle to a cylindrical main, comprising:
   a fitting having a concave cylindrical mounting surface formed on one end thereof, first and second parallel spaced through bores extending from said mounting surface through the length of said fitting to the opposite end thereof, said first and second bores having their centers extending at right angles to the center line of said concave cylindrical surface;
   a port in said fitting interconnecting said first and second bores for fluid communication therebetween, means in said second bore for forming a port in the wall of said main at said end of said second bore adjacent said mounting surface, means releasably sealing said second bore at the end opposite said mounting surface, and said first bore being of a diameter to contact and fuse around the exterior of the first size service line, an annular portion extending from said fitting concentric with said first bore and defining an internal cylindrical surface concentric with said bore at the end away from said mounting surface, said cylindrical surface being of a size for contacting and fusion around the exterior of a second size of service line.

2. An apparatus for selectively connecting a plurality of sizes of service lines at a right angle to a main comprising:
   a fitting having a concave arcuate mounting surface on one end thereof for connection to the exterior of the main, said fitting having a chamber formed therein for communication through a port in said main with the interior of said main; said fitting having first and second parallel spaced through bores, said first and second through bores having their centers extending at right angles to the center line of said main; and
   means on said fitting for selectively connecting said chamber to a plurality of sizes of service lines.

3. The apparatus of claim 2 wherein said connecting means comprises a plurality of concentric bores formed in said fitting.

4. The apparatus of claim 2 wherein said connecting means comprises an annular portion extending from said fitting, said annular portion defining a first internal cylindrical surface for contacting and fusion around the exterior of a first size service line, and a bore in said fitting coaxial with said first cylindrical surface for contacting and fusion around the exterior of a second size of service line.

5. An apparatus for providing service to a plurality of different sizes of service conduits, comprising in combination:
   a. a main conduit; and
   b. a fitting defining a chamber therein, surface means formed on the end of said fitting conforming to the exterior of said main and sealingly attached to the exterior of said main, said fitting having first and second parallel spaced through bores, said first and second through bores having their centers extending at right angles to the center line of said main, means on said fitting for selectively connecting said fitting to a plurality of sizes of service lines extending at a right angle to the main.

6. The apparatus of claim 5 wherein said connecting means comprises a plurality of concentric bores formed in said fitting.

7. The apparatus of claim 5 wherein said connection means comprises an annular portion extending from said fitting, said annular portion defining a first internal cylindrical surface for contacting and fusion around the exterior of a first size service line, and a bore in said fitting coaxial with said first cylindrical surface, the walls of which being of a size for contacting and fusion around the exterior of a second size of service line.

* * * * *

UNITED STATES PATENT OFFICE
CERTIFICATE OF CORRECTION

Patent No. 3,958,593         Dated May 25, 1976

Inventor(s) Joe William Christie

It is certified that error appears in the above-identified patent and that said Letters Patent are hereby corrected as shown below:

Col. 3, line 6, after "with" insert --their--.

Col. 3, line 22, "selelcted" should be --selected--.

Col. 3, line 31, after "can", delete "by" and insert --be--.

Signed and Sealed this

Third Day of August 1976

[SEAL]

Attest:

RUTH C. MASON
Attesting Officer

C. MARSHALL DANN
Commissioner of Patents and Trademarks